Patented July 15, 1924.

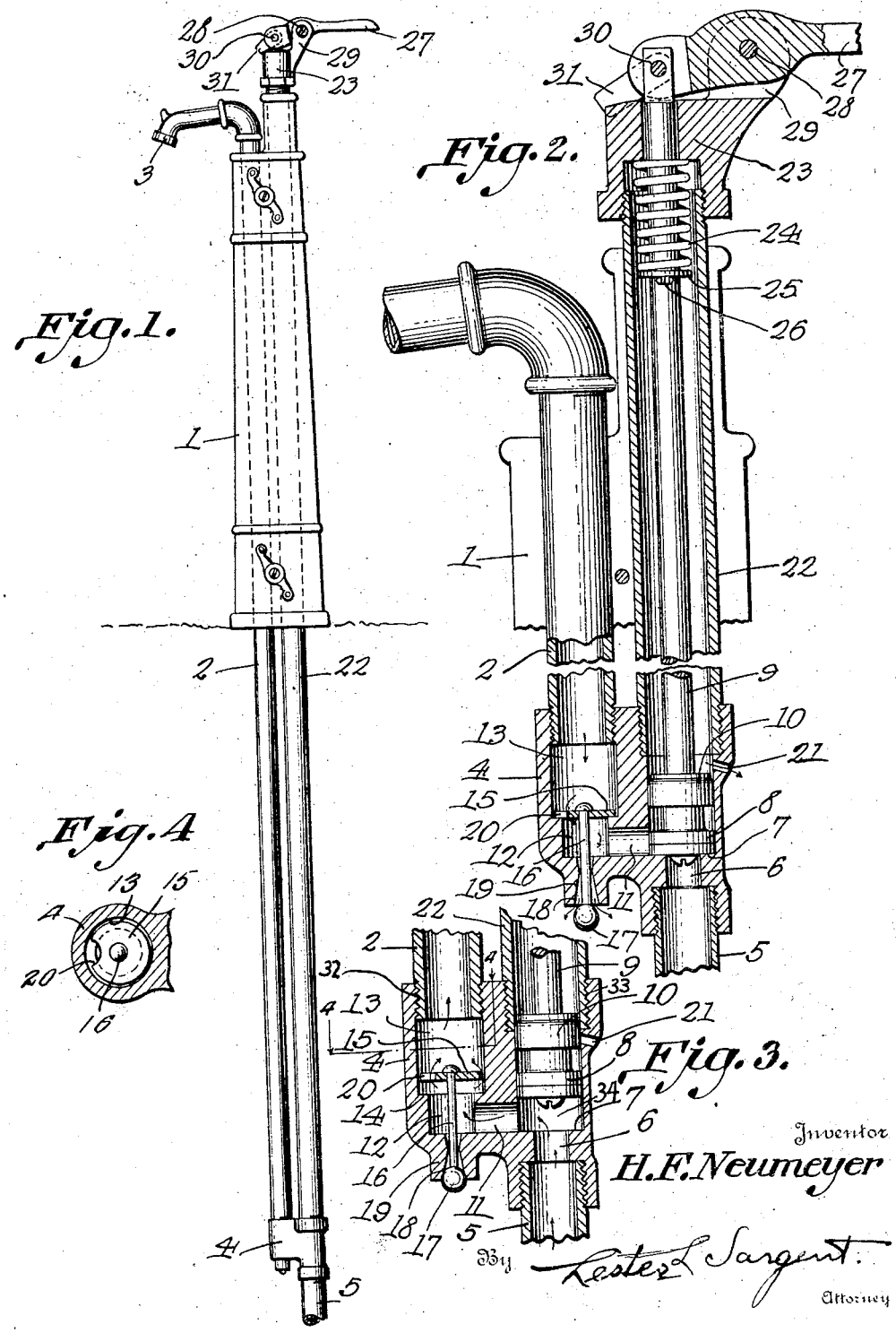

1,501,799

UNITED STATES PATENT OFFICE.

HORACE FALK NEUMEYER, OF MACUNGIE, PENNSYLVANIA, ASSIGNOR TO HOBART G. BIEHN, OF QUAKERTOWN, PENNSYLVANIA.

HYDRANT.

Application filed September 8, 1922. Serial No. 586,981.

*To all whom it may concern:*

Be it known that I, HORACE FALK NEUMEYER, a citizen of the United States, residing at Macungie, in the county of Lehigh and State of Pennsylvania, have invented new and useful Improvements in a Hydrant, of which the following is a specification.

The object of my invention is to provide a device so constructed that while drawing water none is wasted on the ground; and which, when water is shut off will permit water remaining in the discharge pipe to at once and positively evacuate from the device at a point under the frost line, thus making the device anti-freezing; and to provide the novel combination and arrangement of parts hereinafter disclosed, and illustrated in the accompanying drawings, in which—

Figure 1 is a side elevation of the invention;

Fig. 2 is a vertical section, partly in elevation, drawn on a larger scale, and showing the valve 8 in closed position;

Fig. 3 is a detail vertical section with the valve 8 in open position for the inflow of water; and Fig. 4 is a horizontal section on line 4—4 of Fig. 3.

Like numerals indicate like parts in each of the several views.

Referring to the accompanying drawings, I provide a suitable casing 1 in which are mounted water outlet pipe 2 and main stay pipe 22. Pipe 2 is provided with a suitable spout 3. The threaded lower end of pipe 2 is mounted in the threaded socket 32 of valve cage 4, thereby permitting of turning the spout 3 to any desired direction.

Attached to the lowermost portion of valve cage 4 I provide the water inlet pipe 5 which discharges through inlet port 6 of the valve cage to chamber 34 and thence through cross passage 11 into chamber 12, and thence into the enlarged discharge chamber 13. Mounted in chamber 13 I provide a disk 15 having a cut out portion 20. Depending from disk 15 I provide a stem 16 carrying a ball valve 17 which seats in the large end of the restricted passage 18 through the extension 19 of valve cage 4.

Mounted in main stay pipe 22 I provide a rod 9 carrying at its lower end the inverted cup washer 10 positioned above the inlet valve 8 which seats on valve seat 7 in chamber 34 when the valve is in its lowermost position. I also provide an outlet 21 in valve cage 4 adjacent valve washer 10 for escape of water if any leaks past member 10.

Mounted on the upper end of main stay pipe 22 I provide a suitable guiding head 23. Member 23 is provided with upwardly projecting lugs 29 on which operating lever 27 is pivotally mounted by means of pivot 28. Member 27 is pivotally connected with rod 9 by pivot 30. I also provide a suitable gravity operated dog 31 to hold the valve in open position when this is desired.

In operation, when operating lever 27 is depressed it raises rod 9 and valve 8 from its seat, as in Fig. 2, to the position shown in Fig. 3, whereupon water flows through inlet pipe 5 and port 6, chamber 34 and cross passage 11 into chamber 12, and through the cut-out portion 20 of disk 15 in enlarged discharge chamber 13 to the outlet pipe 2. Because of the restricted passage 20 through disk 15 the latter member is raised, as shown in Fig. 3, thereby causing ball valve 17 to close passage 18, so that no water is wasted in the ground. When the water is shut off, however, valve 15 which functions as a control, will return to its seat 14, and ball valve 17 will move away from its seat in passage 18, and water remaining in the discharge pipe will at once and positively drop down under the frost line, making the device anti-freezing.

This hydrant has full openings and even on sandy water will always do its work correctly. As will be observed, in case of any repairs to leather washers being required, the rod 9 and its washers 10 and 8 can easily be removed from the top and again replaced without any tools. The construction is however of such a nature that repairs are seldom needed.

Rod 9 is normally held in its lowermost position, with valve 8 on its seat 7, in consequence of the action of a suitable spring 24, one end of which bears against head 23 while the other end bears against a washer 25 which is held in fixed relation to rod 9 by pin 26.

What I claim is:

1. In a device of the class described, the combination of a valve cage having spaced chambers and a cross passage connecting said chambers, an inlet pipe in communication with one of the chambers, a valve arranged to open or shut off communication between the valve cage and the inlet pipe, manually controlled means for operating said valve, an outlet pipe in communication with the discharge chamber of the valve cage, a disk slidably mounted in said discharge chamber, said disk having a cut out portion forming a restricted passage for the flow of water past the disk, said disk having a depending stem carrying a ball valve, the valve cage having a restricted discharge passage in which the ball valve seats when the disk is in its elevated position, whereby to close the discharge passage when water is flowing through the outlet pipe and to open it upon the cessation of outflow of water.

2. As a new article of manufacture, a valve device for controlling the discharge of waste water in a hydrant, comprising a disk having a cut out portion, a stem depending from said disk, and a ball valve on the lower end of the depending stem, whereby the disk and valve operate as a unit.

3. In a device of the class described, the combination of a valve cage having spaced vertical chambers, one of the chambers being arranged above and in communication with an inlet pipe, a manually operated valve in said chamber, the valve cage having a cross passage connecting the vertical chambers, the valve cage also having a restricted discharge passage opening out of the discharge chamber, the said second chamber having an enlarged portion, a disk slidably mounted in said enlarged portion of the second chamber, said disk having a cut-out portion, a ball valve rigidly connected with the disk and functioning as a unit therewith, said ball valve seating in the restricted discharge passage, and an outlet pipe in communication with the second chamber.

4. In an apparatus of the class described, the combination of a valve cage having spaced chambers, and having a cross passage connecting said chambers, one of said chambers having an enlarged portion, a slotted disk seated in the enlarged portion, said disk being operatively connected to a ball valve, a restricted discharge passage in which said ball valve is adapted to seat to close said passage when water is flowing upwardly through the cage.

5. In an apparatus of the class described, the combination of a valve cage having spaced chambers, and having a cross passage connecting said chambers, one of said chambers having an enlarged portion, a disk slidably mounted in the enlarged portion said disk having a cut out portion, a stem and ball valve depending from the disk, a discharge passage in which the ball valve is adapted to seat, an outlet pipe positioned above the disk, an inlet pipe, a manually controlled valve arranged to open or close communication between the inlet pipe and the cross passage, an opening arranged above said valve for the outflow of water.

6. In an apparatus of the class described, the combination of a valve cage having spaced chambers, and having a cross passage connecting said chambers, valve controlled means for the inflow of water to one of the chambers, means controlled by the upward flow of water through the other chamber, an outlet pipe, valve-control means for the escape of water remaining in the latter chamber and outlet pipe when the water is shut off, the last two means being operatively connected and functioning as a unit, a main stay pipe, said outlet pipe and said mainstay pipe being of sufficient length to position the valve cage below the frost line in the ground, an inlet pipe in communication with the chamber of the valve cage in which is positioned the valve controlling the inflow of water, and valve operating means, said valve operating means including a gravity operated dog to hold the valve in open position when desired.

HORACE FALK NEUMEYER.